July 29, 1930.  W. S. ALLEN  1,771,520
PROCESS FOR THE MANUFACTURE OF SULPHURIC ACID OF A
PURITY KNOWN COMMERCIALLY AS CHEMICAL PURITY
Filed Aug. 29, 1924  2 Sheets-Sheet 1
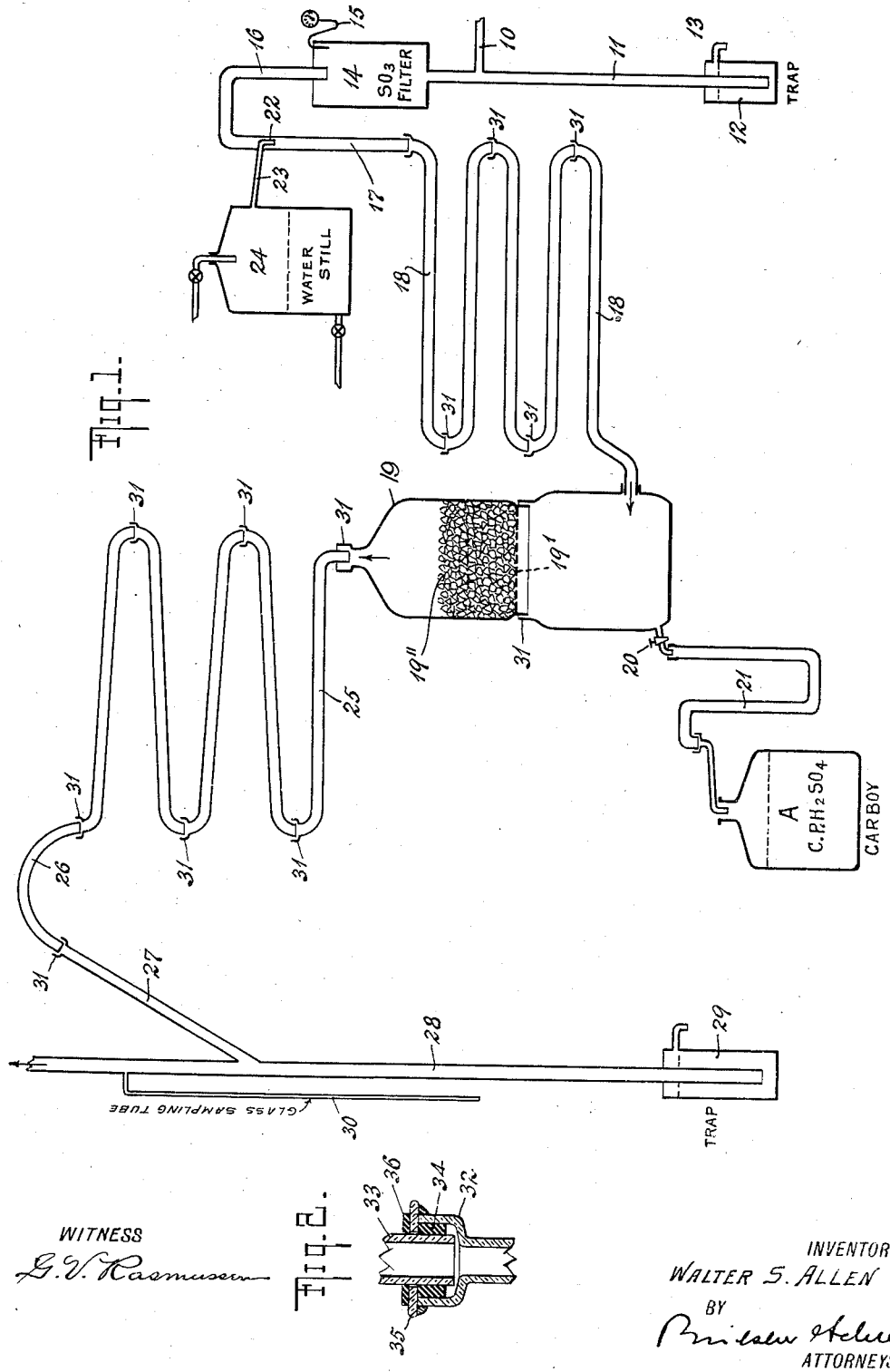
WITNESS
G. V. Rasmussen
INVENTOR
WALTER S. ALLEN
BY
ATTORNEYS

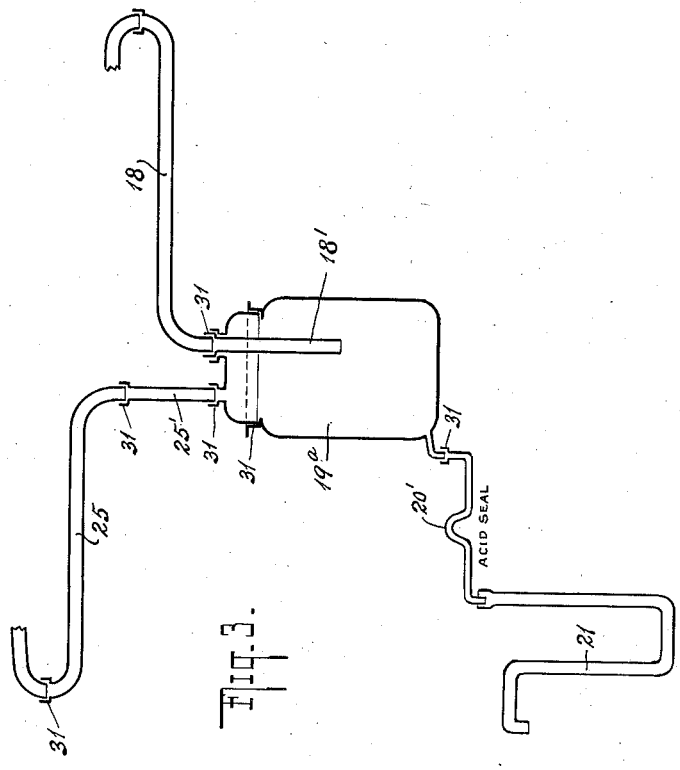

Patented July 29, 1930

1,771,520

UNITED STATES PATENT OFFICE

WALTER S. ALLEN, OF FLUSHING, NEW YORK, ASSIGNOR TO GENERAL CHEMICAL COMPANY, OF NEW YORK, N. Y., A CORPORATION OF NEW YORK

PROCESS FOR THE MANUFACTURE OF SULPHURIC ACID OF A PURITY KNOWN COMMERCIALLY AS CHEMICAL PURITY

Application filed August 29, 1924. Serial No. 734,853.

In the manufacture of sulphuric acid as practiced hitherto, the product obtained by the absorption of sulphuric anhydride in water or strong $H_2SO_4$, did not fulfill the requirements of chemical purity which call, among others, for a liquid as clear as water and for freedom from sulphur dioxide as well as from chlorides and other impurities (originating chiefly from the action of the acid on the metal of which the usual apparatus is composed). In order to obtain sulphuric acid of the high purity known in commerce as chemical purity, it has been found necessary hitherto to purify the crude product referred to above, by subsequent distillation, which, of course, increases the cost of manufacture materially. It will be understood that the term "chemical purity" as used herein, does not refer to absolute chemical purity.

The object of the present invention is to produce sulphuric acid of high purity (commercially known as chemical purity) by a direct process, that is to say, without a distillation treatment. In other words, my invention does not produce a raw product which requires subsequent treatment to bring it to such chemical purity, but yields at once a product of such chemical purity and desired strength.

I will now describe a satisfactory and preferred embodiment of my invention. Reference is to be had to the accompanying drawing, in which Fig. 1 is a diagrammatical elevation, with parts in section of an apparatus suitable for carrying out the improved process; Fig. 2 is a detail of a joint of such apparatus; and Fig. 3 is a fragmentary view showing a different construction and arrangement of certain parts.

The gases containing the sulphuric anhydride (said anhydride having been produced, in the usual application of my invention, by the so-called contact process from sulphur dioxide and oxygen) enter the apparatus through a pipe 10 connected with an upright pipe 11, the lower end of which dips into a liquid contained in a vessel 12, said vessel thus constituting a trap and having an overflow 13. The upper end of pipe 11 leads to the lower portion of a filter 14 containing a suitable material (such as pieces of quartz) for removing suspended impurities from the sulphuric anhydride. The filter is extremely desirable in obtaining pure acid, as there are impurities in the gases coming from the converters which if not removed will tend to contaminate the product. Of course, if the stream of sulphuric anhydride gas is free from suspended impurities, the filter may be dispensed with, but in practically all commercial installations of my invention the filter will be found necessary to obtain a chemically pure product. The upper portion of the filter may be provided with a manometer 15, and has an outlet from which a discharge pipe 16 conveys the gases to the next portion of the apparatus, that is to say, to the reaction or absorption chamber. This chamber consists of a tube 17 suitably constructed to provide a path of sufficient length for the completion of the desired reaction, and this absorption or reaction chamber leads to a cooler or condenser 18, here shown as a coil made with S-bends. The outlet of the condenser discharges into a tower 19, preferably made in two sections for convenience in manufacture, said tower being of much larger cross-section than the condenser pipe. At the bottom of the tower 19 is located a suitable draw-off device, for instance a cock 20 from which the liquid product may be passed through a U-shaped outlet tube 21 to a carboy A or other receptacle. Those parts of the apparatus which come in contact with sulphuric acid, that is to say, the reaction tube 17, the condensers 18 and 25, the tower or collector 19, the cock 20 and draw-off pipe 21, are made of a material, such as for instance silica or glass, not attackable by sulphuric acid. As indicated in Fig. 1, I may put a perforated silica plate 19' between the two sections of tower 19, and partially or wholly fill the space in the tower above the partition, with a suitable packing, such as quartz, or short sections of small silica pipe. The use of such tower packing is of advantage in the production of C. P. oleum, but is generally dispensed with when making acid of less than 100% strength.

The condenser 18 is shown as an air-cooled condenser and is generally operated as such since, as hereinafter more fully explained, a chilling of the vapors is not desirable. However when an increased cooling effect is required, as on very hot summer days, it may be desirable to employ water-cooling, as by allowing water to trickle over the outer surface of the condenser. The U-tube 21, which I prefer to make of glass, is provided with any suitable arrangement (not shown) for cooling it with water.

Within the reaction chamber 17 extends the nozzle 22 of a pipe 23, supplying hot hydrogen oxide, generally as steam. Preferably this nozzle and pipe, or at least such portions thereof as are within the pipe 17, are made of material not attacked by sulphuric acid. The steam may come from any suitable source, for instance, a still 24.

The outlet at the upper end of the tower 19 is connected with a condenser which may consist of a superposed, preferably inclined pipe 25 with suitable connections. This condenser may be water-cooled, as by allowing water to trickle over its outer surface but air cooling is generally sufficient. Its outlet is connected with one end of an upwardly arched pipe 26, the other end of which is connected with a pipe 27 communicating with an upright pipe 28, the upper end of which has a suction connection to a coke box or filter (not shown) while its lower end dips into liquid in a trap 29. The pipe 27 is generally made of iron, but the pipes 25, 26 and the other parts of the condenser connected with the top of the tower 19 are made of silicia or other material not attackable by $H_2SO_4$. At 30 I have indicated a glass tube for sampling the exit gas.

At various points of the apparatus, for instance, those indicated at 31 in Fig. 1, I employ an improved joint which will resist the action of hot strong sulphuric vapors. Details of such a joint are shown in Fig. 2. The end of one of the pipes is shown as made with an enlargement or bell 32, the adjacent end 33 of the other pipe extending into said bell. Between 32 and 33 I place first one or more coils of blue asbestos rope (about one inch diameter) which has been purified by pickling it in hot concentrated sulphuric acid. This prevents the superimposed loose asbestos from falling into the pipes. Above the rope loose purified blue asbestos is packed to fill the space flush with the top of bell 32. The top of the bell is then covered with a glass ring 35, fitted around the pipe 33 and projecting about one inch beyond the outside of 32. A coil of small blue asbestos rope is fitted around 32 underneath the glass and cemented in place by a layer of blue asbestos soaked in sodium silicate. A similar coil is fitted around 33 and above the glass and cemented in place by the same mixture. This cementing material is easily replaced when repairs are necessary. The glass ring 35 protects the asbestos packing 34 from all outside impurities and makes it possible to seal the joint properly. The blue asbestos packing 34, purified as described by the action of hot concentrated sulphuric acid, is not attacked at all by hot strong sulphuric vapors; it is, moreover, cheap and durable. The same procedure is followed in cementing together the two tower sections.

The gas containing about 8% sulphuric anhydride ($SO_3$) and coming, for instance, from the converter of a plant in which sulphuric anhydride is produced by catalytic action, is delivered (by the pressure of the blowers forming part of said plant) through the pipe 10 to the filter 14. The temperature of the gas entering the pipe 10 will of course vary, depending upon the drop in temperature which the gas is allowed to experience after leaving the converter system, but in my preferred method of operation will be about 200° F. The filter removes impurities from the converter gases before they come in contact with the steam at 22 in controlled volume to form acid of say 95% $H_2SO_4$. The injection of hot hydrogen oxide (steam) at 22 results in a sudden rise in temperature to about 450° F., with a corresponding large increase in the volume of gas. In the reaction chamber 17, steam and $SO_3$ mix and react with each other and form $H_2SO_4$ vapor with the liberation of a large amount of heat. The formation at this stage of a vapor as distinguished from the formation of a mist is an important consideration which will be explained in greater detail at a later part of this specification. The high temperature generated by the reaction of the sulphuric anhydride and the steam, while productive of excessive corrosion action unless proper materials are chosen for the equipment, is of particular importance in the operation of my process, as will appear hereinafter. With respect to the materials chosen for the equipment, iron or other ordinary metals would be attacked by such hot $H_2SO_4$ vapor, and the resulting sulphuric acid would therefore not be of chemical purity but would be contaminated by the iron or other metal. For this reason, I employ a resistant substance, such as silica, as the material for the reaction chamber 17 and for the other parts with which the sulphuric acid comes in contact. It is true that, theoretically, platinum or gold would also be suitable; however, their high price precludes their use in practice.

It will be noted that the nozzle 22 discharges the material admitted therethrough (in this case steam) in the direction of the gas current, and thus helps its flow. The proportion of steam admitted may be regulated by a cock or in any other suitable manner, and the strength of the final product may thus be varied as desired; subject, of course, to a corresponding temperature modification which will assure the desired vapor condition in the product. In this way I may, for instance, readily obtain concentrations varying from 30% oleum to 70% $H_2SO_4$. The aforesaid acids are herein termed relatively strong acids. A titrimeter may be employed to check or control the strength of the product. If the product should become too weak, then the amount of steam admitted to reaction chamber 17 is decreased, so that the concentration of the product will be increased. On the other hand, if the concentration of the product becomes too high, then obviously the amount of steam admitted should be increased. It is to be observed, however, that in any case the steam and the sulphuric anhydride are always admitted under such conditions with respect to amounts and temperatures that the resultant product is either in the form of a vapor or readily convertible into that form by the aid of supplemental heat. When $SO_3$ and $H_2O$ are brought together in proper amounts to form directly a relatively strong acid product and at temperatures appropriate to accomplish the objects of this invention, the heat of formation of $H_2SO_4$ is sufficiently great to maintain the entire mass in the state of vapor, but if substantial amounts of mist are formed, the product should first be converted into vapor by supplemental heat, since it is only when the product is in the form of a vapor that the condensation and collection of the sulphuric acid will proceed with that efficiency and facility which is contemplated by my invention.

The sulphuric acid vapors are condensed in the cooler 18 and flow into the lower portion of the tower 19, from which they are drawn off through the cock 20, which under normal conditions is kept open just the right amount to withdraw liquid sulphuric acid at the same rate at which it flows into the tower 19. The gaseous remnant passes to the upper portion of said tower and to the cooler communicating with the outlet of said tower, and any sulphuric acid produced by further condensation in said second cooler flows back into the tower, particularly if the pipes 25 are inclined as shown. The percentage recovery of $SO_3$ in the tower will vary up to a maximum of practically complete recovery, depending upon the size of the cooler 25 and the temperature at which it is maintained. By proceeding in the aforesaid manner, the acid vapor may be condensed without any serious difficulty as the mass of vapor being condensed is substantially free from acid mists which tend to persist in a dispersed condition and to resist aggregation and condensation. Inasmuch as all the parts from 17 to 26 inclusive are made of material not attacked by hot strong sulphuric acid, the production of sulphuric acid of chemical purity is assured.

The expansion in volume resulting from the injection of hot hydrogen oxide tends to produce a relatively high pressure in the absorbing, condensing, and collecting part of the apparatus. As this high pressure would force the sulphuric acid vapors out through any leaky joints, I place the apparatus under suction at the delivery end, by connecting the upper end of pipe 28, for example, with the coke box of the contact plant for the production of $SO_3$. Thus, in the event of a leak, there will be no escape of gases, but only an inflow of air at the leak. I find it advisable to admit sufficient volume of $SO_3$ contact gas, as shown by the pressure on manometer 15, so that there will be an essentially balanced or neutral pressure at the outlet cock 20 of tower 19. This prevents sucking in of air or flowing out of acid gases through this discharge outlet.

The successful operation of my process may be explained as follows: When a stream of sulphuric anhydride containing gas and hydrogen oxide (water) are brought together, a dense, white fog or mist of liquid particles of sulphuric acid is generally formed which is very difficult if not impossible to condense and is quite difficult to remove by even the commonly used methods of gas "scrubbing." Various theories have been advanced to account for the formation of this mist, and various methods have been proposed for its removal (for instance, see U. S. Patent No. 866,843), and I will not attempt to discuss them here, as this objectionable formation of mist is well-recognized in the art. I have discovered that if a stream of sulphuric anhydride gas and hydrogen oxide are brought together under conditions such that the resulting gas has a temperature sufficiently high to cause substantially all of the sulphuric acid formed to exist as a gas (as noted hereinbefore) and this sulphuric acid gas is then condensed under conditions avoiding sudden cooling or chilling of the gas, condensation of gaseous sulphuric acid to liquid sulphuric acid will proceed without the formation of any substantial amount of uncondensable acid mist. This may be explained upon the theory that if the union of sulphuric anhydride and steam is allowed to take place under conditions resulting in the formation of mist, this mist cannot be condensed in a simple condensing system, but the mist is carried along through the condenser in suspension in the gas stream. On the other hand, if the union is caused to take place under sufficiently high temperature conditions to cause substantially all of the sulphuric acid formed to exist as a gas, then this gas can be condensed as a liquid film upon the cooled surface of a simple condenser, without forming appreciable quantities of mist. The condensation probably takes place similarly to the condensation of moisture from the atmosphere upon a glass of iced water. In other words sudden cooling or chilling of the entire stream of gas carrying the sulphuric acid vapor should be avoided to prevent the precipitation of the vapor in the form of mist in the gas stream, but the cooling should be so conducted as to obtain condensation of a liquid film of acid upon the surface of the condenser due to what may be termed "local cooling" of the gas adjacent the condensing surface. If mist does initially form in a gas stream, proper subsequent condensation can be obtained by first heating the gas stream until the mist is transformed into the gaseous state, and then cooling the gas stream under the conditions mentioned above.

Furthermore, I have found that my process affords a simple, easily controlled, and relatively inexpensive method of producing chemically pure sulphuric acid as compared with known distillation processes, and in addition gives a product of exceptional purity. This latter property is made possible by reason of the fact that the constituents of sulphuric acid employed in my process can be produced in a state of high purity, and the process is adapted to be carried out in apparatus almost wholly unattackable by acid. Sulphuric anhydride gas, as produced by the contact process, is quite pure, and upon the removal of any suspended impurities from the gas stream is substantially chemically pure. Hydrogen oxide in the form of steam, as employed in my preferred method of operation, is likewise substantially chemically pure. The condensed product of these two substantially chemically pure agents, reacting and condensing in apparatus substantially unattacked thereby, must therefore be a substantially chemically pure product.

The entire operation furthermore may be carried out in apparatus of relatively small size which may, therefore, be constructed of silica or glass without entailing excessive expense. There is thus no opportunity for contamination of the product, either in the process of formation or subsequent to formation.

The necessary high temperature conditions to cause substantially all of the sulphuric acid formed in the reaction tube 17 to first exist as a gas, results, in the normal operation of my process, from the sensible heat in the entering gas streams, and from the heat of formation of sulphuric acid generated by the combination of the sulphuric anhydride and steam. By using a stream of gas containing about 8% sulphuric anhydride and having an initial temperature in the neighborhood of 200° F., and by reacting with this gas hydrogen oxide in the form of steam, I find that the resulting gas will, as a result of the heat of reaction, attain a temperature such that substantially all of the sulphuric acid formed will exist as a gas. In the ordinary operation of my process, steam in substantially combining proportion is introduced into a stream of sulphuric anhydride gas to give a product consisting of strong sulphuric acid, i. e., about 95% or stronger. If the amount of steam is increased in proportion to the amount of sulphuric anhydride, the temperature of the sulphuric acid gas produced will drop somewhat and thus tend to form the uncondensable mist. Or, if the hydrogen oxide is introduced in the form of a water spray, the resulting gas temperature will drop because considerable heat will be utilized in transforming a portion of this liquid water to water vapor or steam. Under these circumstances, it would become necessary to raise the temperature of the sulphuric acid gas, either by applying external heat to the reaction tube 17, by an electric coil or otherwise, or by increasing the initial temperature of the incoming gas streams of sulphuric anhydride gas or steam. Thus by increasing the temperature of the incoming sulphuric anhydride gas to 300 or 400° F., a higher temperature will be produced in the reaction tube 17. Likewise by using superheated steam the temperature may be increased. In any case, it is necessary to control the variables under the control of the operator to produce a temperature in the gas stream subsequent to the reaction between sulphuric anhydride and hydrogen oxide, such that substantially all of the sulphuric acid formed will exist as a gas.

The temperature necessary to be attained will in general correspond to one higher than the dew point of sulphuric acid for the amount of sulphuric acid present in the gas mixture. That is, for every concentration of sulphuric acid vapor there exists a temperature below which condensation of sulphuric acid vapor to liquid sulphuric acid will commence. For the particular gas strength which I have given by way of example, i. e. an 8% sulphuric anhydride gas to which has been added steam in substantially combining proportion, the dew point or condensation temperature is slightly under 450° F. and accordingly I cause the operation to proceed at or above this temperature. If the strength of sulphuric anhydride gas, and the proportionate amount of steam added to combine therewith, is changed, the corresponding necessary temperature in the resulting gas will change. If the amount of sulphuric acid is lowered by decreasing the strength of the sulphuric anhydride gas, then a lower temperature is permissible because the gas is not as saturated with sulphuric acid vapor as when a stronger gas is employed. This is what actually takes place in the subsequent condensing system. As the amount of sulphuric acid vapor in the gas stream is gradually lessened as condensation takes place, successively lower temperatures are necessary to cause the gas stream to become saturated with vapor and then to deposit the vapor as liquid acid upon the condenser surfaces. When steam in excess of the amount required to combine with the sulphuric anhydride present is introduced into the reaction chamber, a considerable amount of the heat generated is utilized in heating the diluting water vapor and accordingly a lower temperature will result in the gas stream than if a combining proportion of steam were introduced. If this lower temperature is below that at which substantially all of the sulphuric acid formed will exist as a gas, steps must be taken to increase the temperature by any of the methods mentioned above. A simple test by means of which the operator may ascertain if proper temperatures are existing in the reaction chamber is to merely observe the exit gas from the condensing system. If proper conditions are not being maintained, a white cloud or mist will be clearly apparent in the exit gas. An additional test may be made if desired by determining the dew point of sulphuric acid vapor of the strength existing in the reaction chamber. The reaction chamber temperature should not be substantially below this dew point.

The cooling operation occurring in the condensing system must also be controlled to prevent the formation of acid mist. I have found that the sulphuric acid gas will condense readily in an open condensing system if precautions are taken to avoid sudden cooling or chilling of the gas stream at any point. This result is readily attained by employing silica or glass pipe condensers cooled by air. In the summer, when the temperature of the air is relatively high, it may become necessary to resort to water cooling, but in any case this should be regulated to prevent undue chilling of the condenser tubes at any point. The requirement that sudden cooling or chilling be avoided will necessitate that the condensing system have a certain minimum amount of condensing surface per unit of sulphuric anhydride passed through the system per minute, and this minimum amount of condensing surface may be determined in any particular instance by increasing the condensing surface until substantially no sulphuric acid escapes from the condensing system and the exit gas is substantially free of sulphuric acid mist.

It will be noted that the liquid product is withdrawn at the middle of the apparatus, that is to say, between the two coolers. The product withdrawn from the tower 19 is therefore sufficiently hot to be practically free of absorbed $SO_2$ (within the requirements of chemical purity as defined above) and at the same time I am enabled to obtain a high percentage yield of acid. My system in which I provide a collector for the condensate between two coolers, with the second cooler arranged to drain back into the collector, is especially valuable in that I can maintain the temperature of the condensate at such a value as desired to result in the elimination of gaseous impurities, and at the same time obtain a high percentage of recovery, without necessitating the use of complicated apparatus. My system is of simple construction and of a type readily constructed of material not attackable by sulphuric acid.

The sudden decrease in velocity, as the gases pass from the relatively narrow pipe 18 into the wide tower 19, assists in bringing about condensation of the sulphuric acid vapors.

In the construction illustrated by Fig. 3, the reaction products flowing from the cooler 18 enter through an opening in the tower cover, as through a depending pipe portion 18', while the residual gas leaves through another opening in said cover, as by way of a pipe 25'. This figure also shows the use of an acid seal 20' in the pipe 21, for the continuous discharge of acid from the tower 19ª, the stop cock 20 being omitted in this case. It will be understood that the parts not illustrated in Fig. 3, and connected with the parts 18, 21, and 25 respectively, may be of the same construction as shown in Fig. 1.

The entire product may flow through a suitably constructed titrimeter (made of glass), after leaving the tube 21.

Apparatus constructed in accordance with my invention is capable of use in connection with many other processes in which it is desired to form a product and then collect the product by condensation in such a manner as to be free of impurities, without necessitating the use of complicated apparatus, and yet obtain a high degree of recovery.

It is obvious that my process and apparatus may be used for the production of acid of commercial purity if desired.

Various modifications may be made without departing from the nature of my invention as defined in the appended claims.

I claim:

1. In the process of making sulphuric acid by direct combination of $H_2O$ and $SO_3$ and subsequent condensation of the product, the step which consists in withdrawing the product at a stage of the operation where only partial cooling has been obtained and where the temperature is still high enough to cause the removal of sulphuric dioxide from the product.

2. The process of producing chemically pure sulphuric acid which comprises preparing a stream of sulphur trioxide containing gas free from suspended impurities, humidifying said gas to contain an amount of moisture in predetermined proportion to the amount of sulphur trioxide, causing said gas to attain a temperature such that substantially all of the sulphuric acid formed will exist as a gas, cooling said gas to condense the contained sulphuric acid, and collecting the product.

3. A process of producing liquid sulphuric acid of a purity known commercially as chemically pure as the direct product of $SO_3$ and $H_2O$, which comprises first mixing $H_2O$ and $SO_3$ within an acid-resisting environment and reducing the mass resultant from the aforesaid step to the form of a vapor substantially free from mist, and then continuously preserving said vapor condition in said mass until condensation is effected, and conducting the condensation by contact with an acid-resisting material having a temperature intermediate between that of the mass and that which would cause the formation of substantial amounts of acid mist in the vapors undergoing condensation.

4. The process of continuously producing relatively strong sulphuric acid, which comprises continuously reacting sulphuric anhydride with $H_2O$ in such amounts that the heat of reaction maintains the sulphuric acid formed in a gaseous state and in a concentrated condition, continuously cooling the resultant gases of the aforesaid step to cause condensation therefrom of a relatively strong acid while avoiding the formation of an acid mist, and continuously collecting said condensed acid.

5. The process of producing chemically pure sulphuric acid which comprises preparing a stream of sulphur trioxide containing gas free from suspended impurities, humidifying said gas to contain an amount of moisture in predetermined proportion to the amount of sulphur trioxide, causing said gas to attain a temperature such that substantially all of the sulphuric acid formed will exist as a gas, cooling said gas to condense the contained sulphuric acid at a rate such that substantially no sulphuric acid mist will form and remain uncondensed, and collecting the product.

6. The process of producing relatively strong acid, which comprises reacting sulphuric anhydride gas with $H_2O$ under such conditions that the sulphuric acid formed will be in the vapor state and in concentrated condition, condensing said sulphuric acid vapor while avoiding formation of an acid mist, collecting said condensed acid, maintaining a pool of said collected acid at a temperature high enough to cause evolution of gaseous $SO_2$ contained in said acid, and withdrawing acid product from said pool without interrupting the maintenance of the said pool.

7. The process of producing chemically pure sulphuric acid which comprises preparing a stream of sulphur trioxide containing gas free from suspended impurities, introducing an amount of steam into said gas in predetermined proportion to the amount of sulphur trioxide, causing said gas to attain a temperature sufficiently high that substantially all of the sulphuric acid formed will exist as a gas, cooling said gas to condense the contained sulphuric acid, maintaining the condensate at a temperature sufficiently high to eliminate absorbed sulphur dioxide, and withdrawing the condensate as desired.

8. The process of producing chemically pure sulphuric acid which comprises preparing a stream of sulphur trioxide containing gas free from suspended impurities, introducing an amount of steam into said gas in predetermined proportion to the amount of sulphur trioxide, causing said gas to attain a temperature sufficiently high that substantially all of the sulphuric acid formed will exist as a gas, cooling said gas to condense the contained sulphuric acid at a rate such that substantially no sulphuric acid mist will form and remain uncondensed, maintaining the condensate at a temperature sufficiently high to eliminate absorbed sulphur dioxide, and withdrawing the condensate as desired.

9. The process of producing chemically pure sulphuric acid which comprises filtering a stream of sulphuric anhydride containing gas to free it substantially from suspended impurities, bringing said gas into contact with steam in substantially combining proportion to the amount of sulphuric anhyride, causing said gas to attain a temperature such that substantially all of the sulphuric acid formed will exist as a gas, cooling said gas to condense the contained sulphuric acid, and collecting the product.

10. The process of producing chemically pure sulphuric acid which comprises subjecting a stream of sulphuric anhydride containing gas to a filtering action to remove suspended impurities, introducing an amount of steam into said gas in predetermined proportion to the amount of sulphuric anhydride, causing said gas to attain a temperature sufficiently high that substantially all of the sulphuric acid formed will exist as a gas, cooling the gas to condense the contained sulphuric acid, and collecting the product.

11. The process of producing chemically pure sulphuric acid which comprises subjecting a stream of sulphuric anhydride containing gas to a filtering action to remove suspended impurities, introducing an amount of steam into said gas in predetermined proportion to the amount of sulphuric anhydride under conditions such that the resulting gas will be at a temperature sufficiently high that substantially all of the sulphuric acid formed will exist as a gas, cooling the gas to condense the contained sulphuric acid at a rate such that substantially no sulphuric acid mist will form and remain uncondensed, and collecting the product.

12. The process of producing chemically pure sulphuric acid which comprises preparing a stream of sulphuric anhydride containing gas, subjecting said gas to a filtering action to remove suspended impurities, introducing an amount of steam into said gas in predetermined proportion to the amount of sulphuric anhydride, causing said gas to attain a temperature sufficiently high that substantially all of the sulphuric acid formed will exist as a gas, cooling said gas to condense the contained sulphuric acid, maintaining the condensate at a temperature sufficiently high to eliminate absorbed sulphur dioxide, and withdrawing the condensate as desired.

13. The process of producing chemically pure sulphuric acid which comprises preparing a stream of sulphuric anhydride containing gas, subjecting said gas to a filtering action to remove suspended impurities, introducing an amount of steam into said gas in predetermined proportion to the amount of sulphuric anhyride, causing said gas to attain a temperature sufficiently high that substantially all of the sulphuric acid formed will exist as a gas, cooling said gas to condense the contained suphuric acid at a rate such that substantially no sulphuric acid mist will form and remain uncondensed, maintaining the condensate at a temperature sufficiently high to eliminate absorbed sulphur oxide, and withdrawing the condensate as desired.

14. The process of producing chemically pure sulphuric acid which comprises humidifying an $SO_3$ containing gas substantially free from suspended impurities with substantially chemically pure $H_2O$, cooling the resulting gas mixture, regulating the rate of cooling so as to substantially avoid the formation of sulphuric acid mist, and recovering the sulphuric acid formed, the reacting constituents and sulphuric acid formed being maintained out of contact with substances attackable thereby.

15. The process of producing chemically pure sulphuric acid which comprises preparing a gas containing $SO_3$ and substantially free from suspended impurities, introducing steam into said gas to combine with the $SO_3$, cooling the resulting gas mixture, regulating the rate of cooling so as to substantially avoid the formation of sulphuric acid mist and recovering the sulphuric acid formed, the reacting constituents and sulphuric acid formed being maintained out of contact with substances attackable thereby.

16. The process of producing sulphuric acid which comprises preparing a gas containing $SO_3$, humidifying said gas with $H_2O$, causing said gas to attain a temperature such that substantially all of the sulphuric acid formed will exist as a gas, cooling said gas to condense the contained sulphuric acid, and collecting the product.

17. The process of producing sulphuric acid which comprises preparing a gas containing $SO_3$, humidifying said gas with $H_2O$, causing said gas to attain a temperature such that substantially all of the sulphuric acid formed will exist as a gas, cooling said gas to condense the contained sulphuric acid, and collecting the product, the entire process being conducted in apparatus unattackable by sulphuric acid.

In testimony whereof I have hereunto set my hand.

WALTER S. ALLEN.